United States Patent
Wise et al.

(10) Patent No.: US 7,331,221 B2
(45) Date of Patent: Feb. 19, 2008

(54) PRECISION INFLATION CONTROL DEVICE

(75) Inventors: Robert W. Wise, 365 Ely Rd., Petaluma, CA (US) 94954; Shawn Gao, Arcadia, CA (US)

(73) Assignee: Robert W. Wise, Petaluma, CA (US)

( * ) Notice: Subject to any disclaimer, the term of this patent is extended or adjusted under 35 U.S.C. 154(b) by 0 days.

(21) Appl. No.: 11/353,655

(22) Filed: Feb. 13, 2006

(65) Prior Publication Data
US 2007/0186636 A1    Aug. 16, 2007

(51) Int. Cl.
*B60C 23/02*    (2006.01)
(52) U.S. Cl. ..................... 73/146.3; 152/416
(58) Field of Classification Search ................ 137/225; 152/416; 73/146, 146.3
See application file for complete search history.

(56) References Cited

U.S. PATENT DOCUMENTS

| | | | |
|---|---|---|---|
| 4,333,491 A | 6/1982 | Knubley | |
| 4,574,267 A | 3/1986 | Jones | |
| 4,776,766 A | 10/1988 | Brent | |
| 5,505,080 A | 4/1996 | McGhee | |
| 5,587,698 A | 12/1996 | Genna | |
| 5,606,123 A | 2/1997 | Rabizadeh | |
| 6,441,732 B1 | 8/2002 | Laitsaari et al. | |
| 6,561,017 B1 | 5/2003 | Claussen et al. | |
| 6,666,078 B1 | 12/2003 | Claussen et al. | |
| 6,666,518 B2 * | 12/2003 | Bruschi et al. | 297/440.14 |
| 6,744,356 B2 | 6/2004 | Hamilton et al. | |
| 6,826,951 B1 * | 12/2004 | Schuessler et al. | 73/146 |
| 6,838,983 B1 * | 1/2005 | Wong | 340/442 |
| 6,865,930 B1 * | 3/2005 | Claussen et al. | 73/146 |
| 6,868,719 B1 * | 3/2005 | Claussen et al. | 73/146.2 |
| 6,888,450 B2 | 5/2005 | Sasaki et al. | |
| 6,894,607 B1 | 5/2005 | Claussen et al. | |
| 6,905,135 B2 | 6/2005 | Breed | |
| 7,032,611 B1 * | 4/2006 | Sheng | 137/225 |
| 7,051,585 B2 * | 5/2006 | Claussen et al. | 73/146.3 |

(Continued)

FOREIGN PATENT DOCUMENTS

EP    0 303 469 A2    2/1989

(Continued)

OTHER PUBLICATIONS

Air Compressor and Digital Tire Pressure Gauge. The Home Store. http://homestore3.com/noname22.html; http://store.yahoo.com/store3-store/noname22.html. Nov. 3, 2005.

(Continued)

*Primary Examiner*—Andre J. Allen
(74) *Attorney, Agent, or Firm*—Michael A. Glenn; Glenn Patent Group (57) ABSTRACT

A method and apparatus to regulate the inflation of objects. To start inflation, the apparatus couples a fluid source to the object via a plenum. Concurrent with inflation, the apparatus substantially continuously measures pressure within the plenum using a sensor sufficiently proximate the object such that pressure measured by the sensor is substantially similar to pressure within the object. When measured pressure exceeds a target pressure by a prescribed margin, the apparatus stops inflating. While inflation is stopped, the apparatus reads pressure measured by the sensor and deflates the object as needed to reduce measured pressure to the target pressure.

19 Claims, 4 Drawing Sheets

U.S. PATENT DOCUMENTS

| | | | |
|---|---|---|---|
| 7,171,848 B2* | 2/2007 | Giustino et al. | 73/146 |
| 2002/0075145 A1 | 6/2002 | Hardman et al. | |
| 2002/0101067 A1 | 8/2002 | Breed | |
| 2004/0007302 A1* | 1/2004 | Hamilton et al. | 152/416 |
| 2004/0021560 A1 | 2/2004 | Sasaki et al. | |
| 2004/0021561 A1 | 2/2004 | Sasaki et al. | |
| 2004/0099055 A1 | 5/2004 | Komatsu et al. | |
| 2005/0097949 A1 | 5/2005 | Hillenmayer et al. | |
| 2005/0102073 A1 | 5/2005 | Ingram, II | |
| 2005/0199328 A1 | 9/2005 | Schoenberger et al. | |
| 2006/0180256 A1* | 8/2006 | Mittal | 152/416 |

FOREIGN PATENT DOCUMENTS

| | | |
|---|---|---|
| EP | 1 043 179 B1 | 10/2000 |
| EP | 1 245 413 A2 | 10/2002 |
| EP | 1 291 230 A2 | 3/2003 |
| EP | 1 347 619 A2 | 9/2003 |
| WO | WO 02/07993 A2 | 1/2002 |
| WO | WO 03/047887 A1 | 6/2003 |
| WO | WO 03/047888 A1 | 6/2003 |
| WO | WO 03/047889 A1 | 6/2003 |
| WO | WO 2004/085172 A2 | 10/2004 |

OTHER PUBLICATIONS

Williams, P. CanadianDriver:Product Review-Michelin Tire Pressure Gauge and Air Pumps. http://canadiandriver.com/articles/pw/michelin.htm. Jul. 13, 2004.

Programmable Tire Gauge, et al. AutoSport. http://www.autosport-catalog.com/index.cfm?fa+s&keywords+tire%2520gauge&sc+7542.

2-10 Wheel Tire Pressue Monitors. Doran Mfg Llc. http://www.doranmfg.com/doran_pressure_pro.htm. Nov. 3, 2005.

An Evaluation of Existing Tire Pressure Monitoring systems. U.S. Dept. of Transportation. National Highway Traffic Safety Administration. Jul. 2001.

Smartpressure Tire Gauge. Brookstone. Oct. 30, 2003.

Accutire Set Point Programmable Tire Gauge. http://www.autogeek.net/tire-gauge.html. before Jan. 24, 2006.

Longacre Tire Inflater. http://www.cdoc.com/detail.asp?id+14877&str+4000-2525-0253&name . . . before Jan. 24, 2006.

Cordless Inflator with Light. http://www.safety-devices.com/cc2400.htm. before Jan. 24, 2006.

Equipment News. http://bultransporter.com/mag/transportation_equipment_news/. before Jan. 24, 2006.

Intercomp Memory Tire Gauge. Users Manual. www.intercompco-racing.com. Oct. 2003.

Weakman, K. Intelligent Tire Inflator. http://www.circuitcellar.com/msp430/hc.htm. Dec. 17, 2001.

Smart Air. http://www.smartair.com/CLTdatasheet.htm. Jan. 28, 2006.

\* cited by examiner

PRECISION INFLATION CONTROL DEVICE

BACKGROUND OF THE INVENTION

1. Field of the Invention

The present invention relates to inflation control devices. More particularly, the invention concerns a portable computer-driven apparatus for inflating an object to a desired pressure while accurately measuring the inflation pressure.

2. Description of the Related Art

As long as there have been inflatable devices, there has been a need for machines to inflate them. In today's market there are many different inflatable contraptions to inflate sports balls, supplemental restraint systems, air mattresses, automotive shocks, vehicle tires, surgical blankets, balloons, tents, and other inflatable objects. Although the inflation medium is typically air, other substances are sometimes used, with nitrogen being one example.

There are probably more devices for inflating vehicle tires than any other inflatable item, since by sheer numbers, automobile, truck, and bicycle tires are probably the most common inflatable items in existence. Most rudimentary of all these devices is the simple hand or foot operated pump. Coupled with the separate act of hand-checking tire pressure with a manual tire gauge, this seems to provide a complete solution for many. A more advanced approach employs an air compressor machine to avoid the labor of the hand or foot-operated pump. For some people, these traditional approaches are cumbersome and time consuming, however, requiring the user to repeatedly switch back/forth between the acts of inflating and then measuring pressure.

Further advancements have produced machines with various levels of automation. Still, many of these are limited to specific installations on-board commercial trucking or high-end autos. These are out of reach for the typical consumer who already owns a bicycle or passenger car that is neither a commercial truck nor a high-end auto. Furthermore, the up-front expense of an on-board system cannot be shared among multiple vehicles; the on-board equipment only benefits the single vehicle of installation. These and others of the known automated solutions do not always provide the level of convenience, portability, and accuracy that some users might desire.

Since known inflation machines do not fully address these unsolved problems, then, they may not be completely adequate for all users.

SUMMARY OF THE INVENTION

Broadly, the present disclosure concerns a method and apparatus to regulate the inflation of objects. To start inflation, the apparatus couples a fluid source to the object via a plenum. Concurrent with inflation, the apparatus substantially continuously measures pressure within the plenum using a sensor sufficiently proximate the object such that pressure measured by the sensor is substantially similar to pressure within the object. When measured pressure exceeds a target pressure by a prescribed margin, the apparatus stops inflating. While inflation is stopped, the apparatus reads pressure measured by the sensor and deflates the object as needed to reduce measured pressure to the target pressure.

The teachings of this disclosure may be implemented as a method, apparatus, logic circuit, signal bearing medium, or a combination of these. This disclosure provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1A:
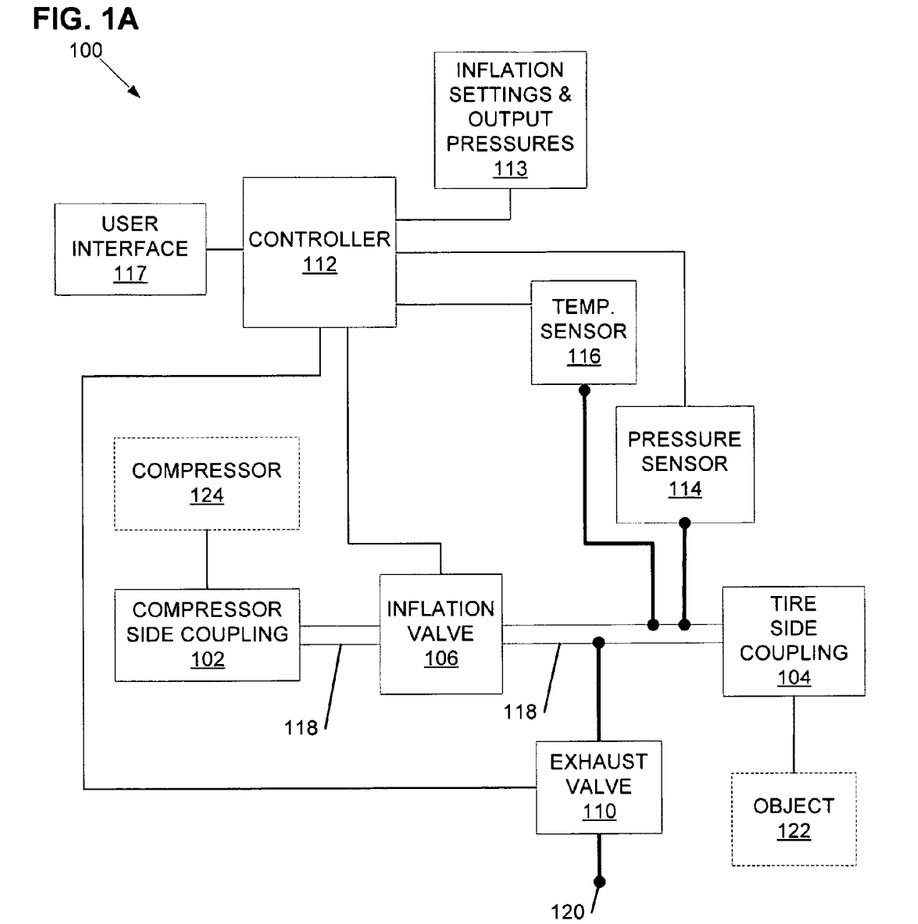
FIG. 1A is a block diagram of the hardware components and interconnections of an inflation control system.

One aspect of the present disclosure concerns an inflation control system, which may be embodied by various hardware components and interconnections. FIG. 1A shows one example, in the form of the inflation control system 100. Without any intended limitation, and merely for ease of illustration, the following discussion is given in the context of inflating automobile tires. The system 100 is equally applicable to inflating other inflatable devices such as bicycle tires, and for using other inflating media than air. Although object 122 to be inflated is not part of the system 100, the object 122 is show to provide a complete and easily understood illustration.

The system 100 includes a single conduit 118, as illustrated, or multiple conduits as an alternative. The conduit 118 is a plenum to receive air from a compressor 124 and provide air to the object 122 to be inflated. The conduit 118 comprises metal, plastic, or another material similarly capable of holding the desired inflation medium and maintaining its shape. The conduit 118 is attached to a compressor side coupling 102 and a tire side coupling 104. The tire side coupling 104 may be more broadly referred to as an object side coupling in the event the system 100 is implemented to inflate objects other than tires. In the example of tires, the coupling 104 comprises a Shrader valve fitting, Presta valve fitting, or any other fitting suitable to the intended pneumatic tire.

As to the coupling 102, this coupling is implemented differently depending upon whether the compressor 124 is built-in to the system 100. In one embodiment, the compressor 124 is not part of the system 100 (but merely shown for the sake of completeness). Here, the coupling 102 comprises a pneumatic quick-disconnect fitting. As one example (FIG. 1C), the coupling 102 is a fitting type illustrated by 182 whereas the compressor 124 includes the counterpart fitting 183. In a different example, where the compressor 124 is built-in to the system 100, the coupling 102 may comprise this or a more permanent attachment such as hose clamp, welding, press fit, threaded connector, shrink fit, or other means.

An inflation valve 106 is attached to the conduit 118, and serves to regulate fluid flow through the conduit 118 according to input from a controller 112. In the illustrated example, the valve 106 is an on/off valve to substantially stop or freely permit fluid flow in the conduit 118 (between couplings 102, 104) according to an electrical, magnetic, or other remotely applied input from the controller 112. The conduit 118 is also provided with an exhaust valve 110, which selectively permits fluid to escape from the conduit 118 under direction of the controller 112. The exhaust valve 110 may be placed in the conduit 118 directly, or installed in a side-port 120 as illustrated. One example of the exhaust valve 110 is a similar component as the valve 106.

The system 100 also includes temperature 116 and pressure 114 sensors coupled to the conduit 118 appropriately to measure temperature and pressure within the conduit 118. The sensors 116, 114 provide their respective outputs to the controller 112. As an example, the temperature sensor 116 may comprise a thermo resistor, where increasing temperatures lower the sensor 116's resistance by an appropriate rate such as 10 k ohm/25 C. degree. Of course, there are many other types of temperature sensors are known, and many of these may be appropriate for use as the sensor 116. As an example, the pressure sensor 114 comprises a pressure sensor, transducer, transmitter, or other sensing device employing any available technology, such as a piezoelectric member, silicon sensor, capacitive or other diaphragm, Bourdon tube, bellows or any other technology.

The positioning of the sensor 114 recognizes that pressure varies dynamically from the object 122 to the compressor 124 (in most cases increasing), and most accurate pressure measurements will occur nearest the object 112. Advantageously, then, the pressure sensor 114 is positioned sufficiently near the coupling 104 such that pressure measured by the sensor 114 is substantially similar to static pressure of the inflatable object 122. Static pressure is used to refer to pressure strictly within the object 122 as uninfluenced by the compressor 124, or alternatively, the state of pressure within the object 122 if the coupling 102 were to be closed.

In practice, the distance between the sensor 114 and the coupling 104 may be in the range of five centimeters, although this amount may vary depending upon the details of implementation. Similarly, to provide accurate temperature readings, and accounting for the fact that temperature also varies from the object 122 to the compressor 124, the temperature sensor 116 is positioned sufficiently near the coupling 104 such that temperature measured by the sensor 116 is substantially similar to temperature of an inflatable object 122 attached to the object-side coupling 104. In practice, this distance may be in the same range of positioning as the sensor 114, although this amount may vary depending upon the particular application. Alternatively, the temperature sensor 116 may be omitted in applications that do not demand such a high level of accuracy as to require temperature compensation.

The controller 112 comprises a digital data processing device coupled to the sensors 116, 114 and valves 106, 110. The compressor 112 selectively operates the valves 106, 110 according to information from the sensors 116, 114 and user interface 117. The controller 112 also manages the presentation of human-readable information at the interface 117. The controller 112 may be implemented by hardware or software or a combination. The makeup of the controller 112 is described in greater detail below, with reference to an exemplary digital data processing apparatus, logic circuit, and signal bearing medium. One specific example of the controller 112 is an MCU such as the SONIX model SN8P1909, which is programmed in assembly language.

As an optional feature of the system 100, the controller 112 may be coupled to a record 113 of inflation settings and output pressures. The record 113 comprises machine-readable digital storage, and contains an array of desired final/output pressures indexed according to various inflation settings such as vehicle make/model/type/year, tire size or location, vehicle inflation profile, season of year, date and/or time, front versus rear tire, etc. The term "array" is used without any intended limitation, as this array may be embodied in an array structure, matrix, lookup table, relational database, linked list, string, computing algorithm, or any other construct that is useful for the purposes illustrated herein. Furthermore, the record 113 may be reconfigurable by the user, for example, accommodating user specification of target pressures corresponding to various vehicle inflation profiles.

A user interface 117 is coupled to the controller 112. The user interface 117 includes a user input facility and a user output facility. As to the input facility, this may include a keypad, keyboard, dials, buttons, sliding controls, touch screen, or a combination of these or another device for receiving user input. As an additional feature of the input facility, there may be a trigger 156 (FIG. 1B, described below) for the user to initiate inflation. This user-activation function, however, may be satisfied by one of the previously mentioned input devices, or by another, separate button, wheel, sliding control, detent, tab, etc. As to the output facility, this may include a visual display (with LCD being one example), sound generating device, mechanical indicator such as digits or dials, or a combination of these or another device for providing a human-readable output.

The system 100 may receive electrical power from 110 VAC, which is reduced and converted to DC by transformer circuitry (not shown). In another example, the system 100 runs on battery power, with one example being a bank of ten 1.2 V, 600 MAH Ni—He rechargeable batteries Exemplary Digital Data Processing Apparatus As mentioned above, the controller 112 may be implemented in various forms. One example is a digital data processing apparatus, as exemplified by the hardware components and interconnections of the digital data processing apparatus 200 of FIG. 2.

Figure 2:
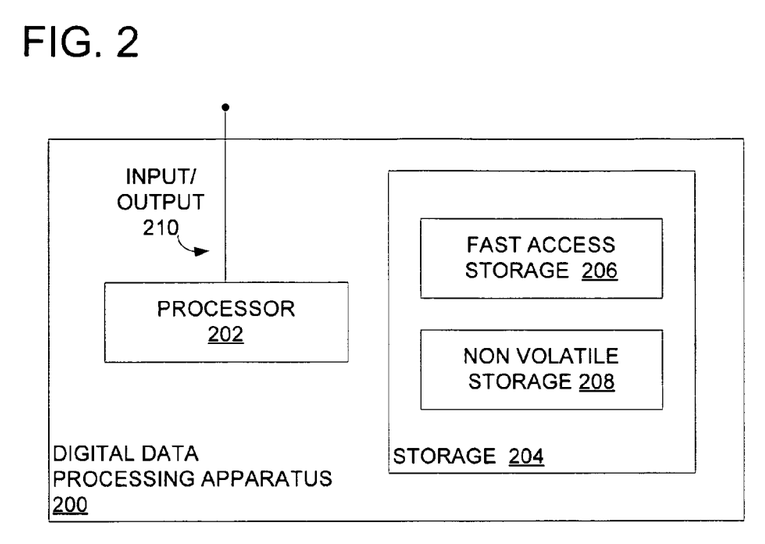
FIG. 2 is a block diagram of a digital data processing machine.

The apparatus 200 includes a processor 202, such as a microprocessor, personal computer, workstation, controller, microcontroller, state machine, or other processing machine, coupled to storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Signal-Bearing Media

Figure 3:
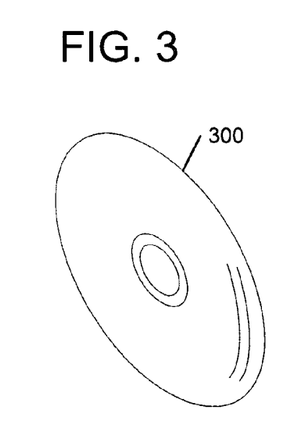
FIG. 3 shows an exemplary signal-bearing medium.

In cases where the controller 112 is implemented by the apparatus 200 of FIG. 2, the processor 202 serves to execute various machine-readable instructions. These instructions may reside in the storage 204 as illustrated in FIG. 2, another form such as the storage media 300 (FIG. 3), or another form still. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), or other suitable signal-bearing media.

Logic Circuitry

Figure 4:
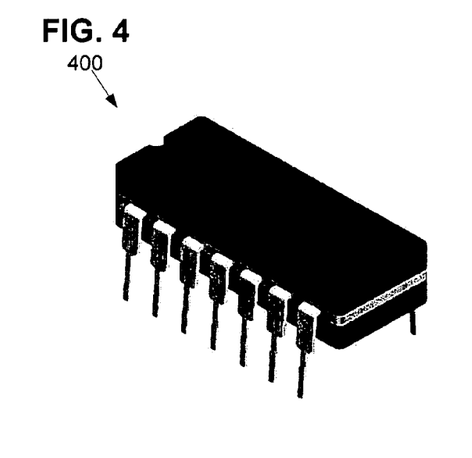
FIG. 4 is a perspective view of exemplary logic circuitry.

In contrast to the signal-bearing media and digital data processing apparatus discussed above, a different embodiment of this disclosure uses logic circuitry instead of computer-executed instructions to implement the controller 124. As one example, this circuitry may be implemented by one or more integrated circuits such as the circuit 400 of FIG. 4.

Moreover, depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Housing

Figure 1B:
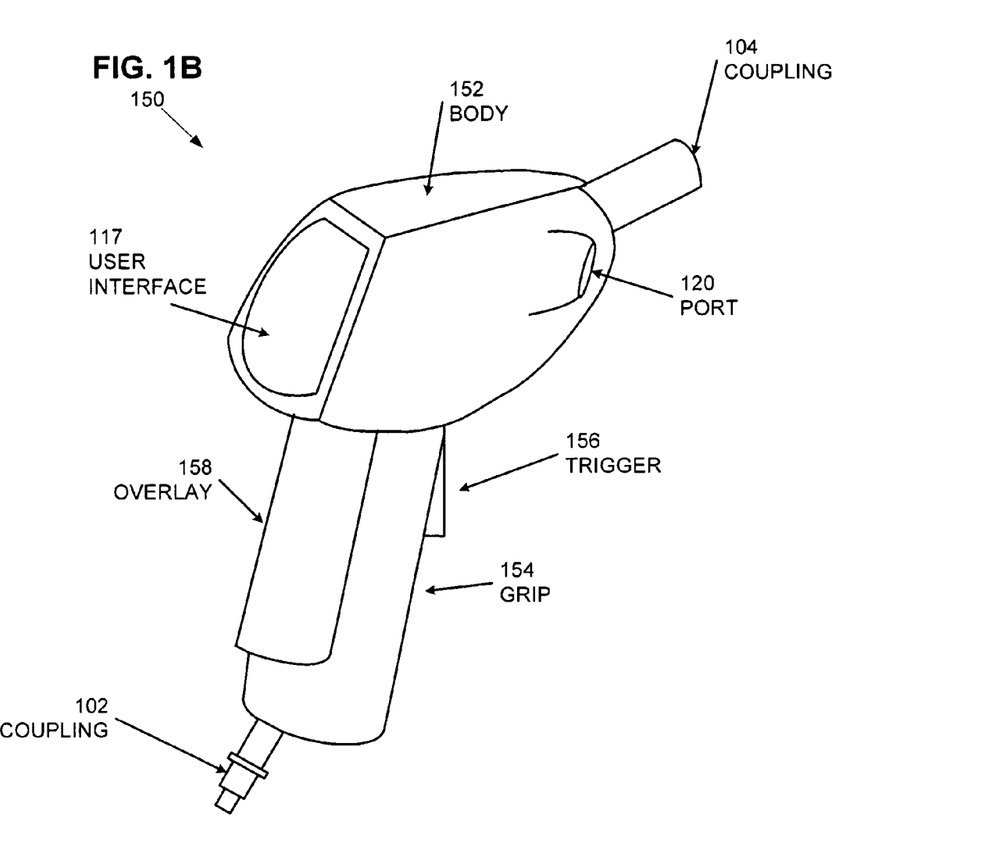
FIG. 1B is a perspective view of one embodiment of inflation control system housing.
Figure 1C:
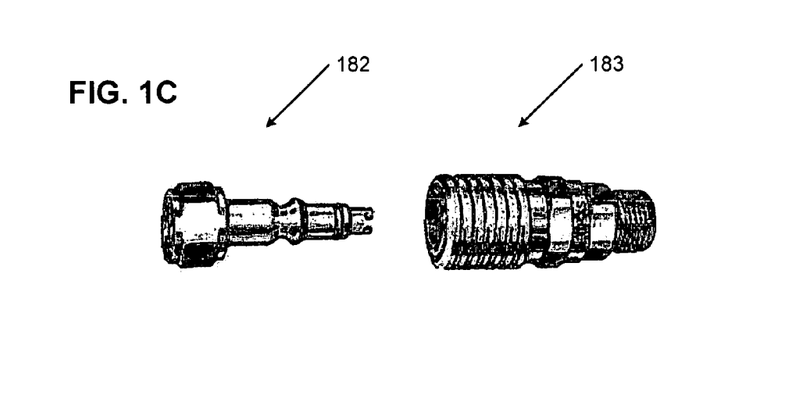
FIG. 1C is a perspective view of exemplary quick disconnect fittings.

Optionally, the components of the system 100 may be provided with a housing such as 150 (FIG. 1B). The illustrated housing 150 encloses the conduit 118, inflation valve 106, exhaust valve 110, pressure sensor 114, temperature sensor 116, and controller 112, which are all hidden from view in FIG. 1B. The user interface 117 is located at the rear of the body 152. Depending upon size of the housing 150, aesthetics, and other concerns, the exhaust port 120 may be internal to the housing 150, or it may extend from the housing 150 as illustrated by 120 as shown in FIG. 1B. Furthermore, the shape, layout, and other features of the housing 150 may be changed.

As shown, the housing 150 assumes a shape that is conducive to handheld manipulation, and application of force suitable to keep the coupling 104 in contact with a tire valve while concurrently viewing the interface 117. The housing's shape is exemplified by a body 152 attached to a grip 154 that extends at some angle (such as ninety degrees) from the body 152. In one example, the housing 150 is made of aluminum with a rubber overlay 158 applied to the grip 154 region.

The body 152 includes the tire side coupling 104 at one end, and at the other end of the body, the user interface 117 and the body 152's attachment to the grip 154. Opposite its attachment to the body 152, the grip 154 includes the compressor side coupling 102. Optionally, as a supplementary user interface, the grip 154 may include a trigger 156 for user-control of manual inflation.

Operation

Having described the structural features of the present disclosure, the operational aspect of the disclosure will now be described.

Overall Sequence of Operation

Figure 5:
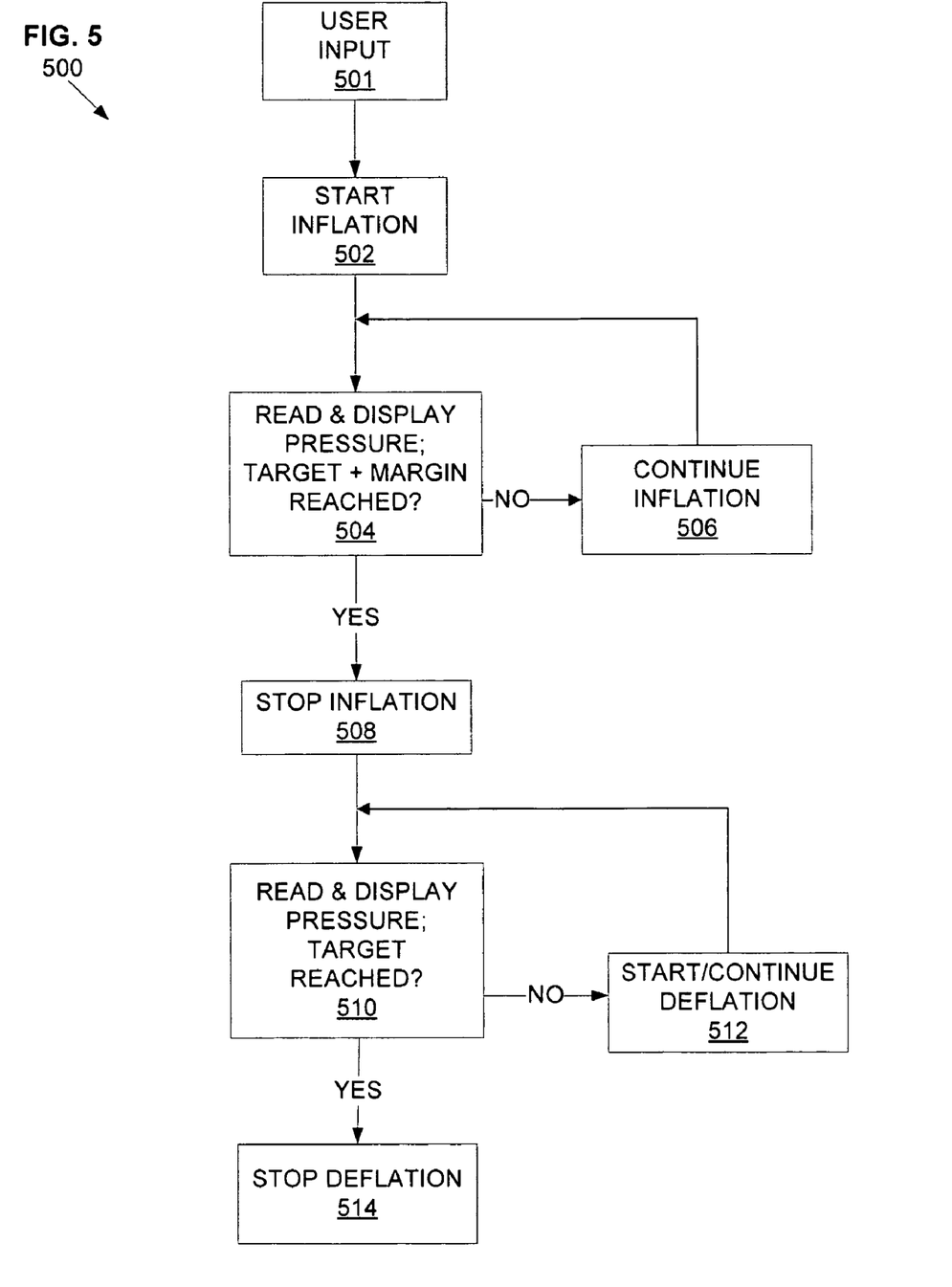
FIG. 5 is a flowchart showing a sequence for regulating the inflation of objects.

FIG. 5 shows a sequence 500 to illustrate one example of the method aspect of this disclosure. Broadly, this sequence 500 regulates the inflation of objects. For ease of explanation, and without any intended limitation, the sequence 500 is illustrated in the specific context of the system 100, and in the context of inflating automobile tires with air.

In step 501, the user configures the system 100. For example, the user attaches the coupling 102 to a compressor 124 (if there is no compressor integrated into the system), and attaches the system 100 to a power source (if one is not integrated into the system). Also during step 501, the user attaches the coupling 104 to the tire 122 to be inflated.

In cases where the system 100 is configured to operate in an automatic mode, one option is for the user in step 501 to directly enter a target tire pressure via the interface 117 ("direct entry"). Namely, the user operates the interface 117 to enter (step 501) one or more desired target inflation pressures for one or more tires, and then starts inflation by activating (step 502) the user interface 117 (such as the trigger 156). For example, the user may enter a desired inflation pressure of 35 PSI. In this example, the system 100 will then act to fill each tire to the desired inflation pressure of 35 PSI, as discussed in step 502-514, described below. In another example, the user may enter several different inflation pressures for differently located or differently sized tires.

In a different example of automatic mode ("programmed selection"), the user enters inflation settings (such as vehicle type) rather than actual pressures, and the controller 112 cross references these inflation settings in the record 113 to determine or compute one or more appropriate target inflation pressures.

One example of programmed selection is where the user selects from several pre-stored vehicle profiles in step 501, and the controller 112 consults the record 113 to look-up the target pressure corresponding to that profile. And, if the user has not yet defined any profiles, or wishes to change them, in step 501 the controller 112 accepts the user's specification of target pressures for one or more vehicle profiles, and stores them in the record 113. These profiles may be referred to as inflation profiles, vehicle profiles, user-defined profiles, etc.

Instead of the user-defined profiles of programmed selection, the controller 112 allows the user to invoke other pre-programmed inflation pressures by entering other inflation settings such as: (1) make, model, year, or other vehicle identification, (2) summer, winter, spring, fall season, (3) time or date, (4) front versus rear pressures, etc. The controller 112 cross-references these user-entered inflation settings in the record 113 to lookup or compute one or more pre-programmed target inflation pressures.

After making the inputs of step 501, whether manual or automatic, the user squeezes the trigger 156 or other facility of the interface 117 to begin. In this example, the system 100 proceeds to fill each tire until (1) the user releases the trigger 156 in manual mode, or (2) the sensed pressure reaches the target pressure in automatic mode. Details of the inflation cycle are explained below with reference to steps 502-514, below.

In step 502, the user interface 117 starts inflation responsive to the user's input, such as a trigger 156 squeeze as discussed above. Accordingly, the controller 112 begins inflation in step 502. Here, the controller 112 operates the inflation valve 106 to assume an "on" position, enabling fluid flow between the compressor side 102 and tire side 104 couplings. This permits air to rush in from the compressor 124 into the tire 122 attached to the coupling 104.

Next, inflation is conducted continuously, and simultaneously, continuous readings of pressure are made. Instead of continuously, these may be conducted on periodic or other practically continuous basis. These steps, in a more particular implementation, are carried out in steps 504, 506. In step 504, the controller 112 takes frequent or even continuous pressure readings from the sensor 114, and asks whether the target pressure (plus a certain margin) has been reached. If not, inflation continues (506) and step 504 repeats. Optionally, step 504 may continually update the user interface 117 to display the pressure being sensed at 114.

When the target pressure plus a prescribed margin is reached (504), then the controller 112 stops inflation (step 508) by closing the inflation valve 106. This is discussed in greater detail below.

In the case of the automatic mode, the "target" pressure is established as discussed above (step 501) by direct user entry, or by the controller 112 recalling a pre-programmed output pressure from the record 113 as appropriate to the vehicle profile, season, day of the year, vehicle type or make/model/year, or other user-entered inflation settings input (from 501). In the manual mode, the target pressure is not established until the user releases the trigger 156; namely, when the user sees that the pressure displayed by the interface 117 (at step 504) reaches a desired pressure, the user releases the trigger 156, thereby establishing the displayed pressure as the target pressure.

Optionally, step 504 may include the additional operation of temperature-correcting the pressure reading of step 504. This may be achieved by the controller 112 reading temperature from the sensor 116, and using this temperature reading to correct the pressure measured in 504. Correction may be achieved, for example, by consulting a lookup table or other appropriate reference in machine-readable storage. More particularly, such a lookup table cross-references different combinations of measured pressure and measure temperature against actual pressure. This table may be prepared by experimentation, or by computation using an equation such as the Ideal gas law, Van der Waals equation, Peng-Robinson equation of state, etc. As a particular example, the lookup table may offset measured pressure according to temperature.

Step 508 ceases inflation, but only after reaching the target pressure plus a prescribed margin (504). The prescribed margin may be a percentage of the target pressure, a fixed value, a value determined by vehicle type, or another fixed or calculated figure. In one example, the prescribed margin is 0.5 PSI or another amount where, accounting for the size of conduit 118, exhaust valve 110, and tire 122, the deflate time (described below) will last for a given time such as one second. By incorporating this prescribed margin, step 508 accounts for the inherent error in measuring pressure dynamically (i.e., with valve 106 open), and provides sufficient, intentional, over-inflation so that pressure can be more accurately set by controlled deflation while the valve 106 is closed (as discussed in greater detail below).

To stop inflation (step 508), the controller 112 directs the inflation valve 106 to close, thereby preventing fluid flow between the couplings 102, 104. Now with the valve 106 closed, the sensor 114's reading is more accurate than when the conduit 118 is opened to the compressor 124. And, since the tire has been slightly over-inflated (step 504), subsequent steps can accurately establish tire pressure by deflation alone. Accordingly, steps 510, 512 continuously read pressure measured by the sensor 114 while operating the exhaust valve 120 as needed to reduce measured pressure to the target pressure exactly. These may be conducted continuously or practically continually if sufficient to provide the same effect. Pressure readings (510) may be compensated for temperature in the same manner as discussed above.

Steps 510 and 510, in more detailed description, occur as follows. The controller 112 in step 510 continuously reads pressure from the sensor 114, and asks whether the target pressure has been reached. If not, the controller 116 controls the exhaust valve 110 to start (or continue) deflation in step 512, and step 510 continues. Optionally, step 510 may additionally operate the user interface 117 to display the sensed pressure. Upon reaching the target pressure (510), the controller 112 stops deflation (step 514) by closing the exhaust valve 110.

Optionally, step 510 may utilize a slightly elevated target pressure in step 510, to account for the volume of conduit 118 between the coupling 104 and the inflation valve 106, since this volume of fluid will escape when the tire 122 is ultimately disconnected from the coupling 104. Optionally, the conduit 118 may be designed such that the volume of conduit between the valve 106 and the coupling 104 is minimal, such that negligible pressure loss occurs when the tire is disconnected from the coupling 104.

Step 514 ends the sequence 500. In one example, the user then removes the tire 122 from the coupling 104 and proceeds to repeat the sequence for another tire, until finished with all tires.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD, or any other form of storage medium known in the art. An exemplary storage medium is coupled to the processor such the processor can read information from, and write information to, the storage medium. In the alternative, the storage medium may be integral to the processor. In another example, the processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-driven portable apparatus for establishing tire pressure, comprising:
    a conduit including a tire-side coupling and compressor-side coupling, the compressor-side coupling comprising a universal quick disconnect fitting compatible with $3/8$ inch pneumatic hose;
    an electrically activated inflation valve connected to the conduit to selectively start and stop fluid flow between the couplings;
    an electrically activated exhaust valve connected to the conduit to selectively exhaust fluid from the conduit;
    a pressure sensor positioned in the conduit sufficiently proximate the tire-side coupling such that pressure measured by the sensor is substantially similar to pressure of a tire alone when coupled to the tire-side coupling;
    a controller programmed to regulate inflation of a tire coupled to the tire-side coupling, comprising operations of:
        starting tire inflation by operating the inflation valve to permit air flow between the couplings;
        during substantially continuous inflation, substantially continuously reading pressure measured by the sensor;
        when measured pressure exceeds a target pressure by a prescribed margin ceasing inflation by operating the inflation valve to stop air flow between the couplings;
        while air flow between the coupling is stopped, reading pressure measured by the sensor while operating the exhaust valve as needed to reduce measured pressure to the target pressure.

2. The apparatus of claim 1, further comprising:
    a housing enclosing the conduit, inflation valve, pressure sensor, and controller;
    where the housing includes a body attached to a substantially perpendicular grip extending at an angle from the body;
    where the tire side coupling is positioned at the body opposite the grip;
    where the compressor-side coupling is positioned at the grip opposite the body.

3. A computer-driven portable apparatus for establishing tire pressure, comprising:
    an air compressor machine;
    a conduit including a compressor-side coupling attached to the compressor machine, the conduit also including a tire-side coupling;
    an electrically activated inflation valve connected to the conduit to selectively start and stop fluid flow between the couplings;
    an electrically activated exhaust valve connected to the conduit to selectively exhaust fluid from the conduit;
    a pressure sensor positioned in the plenum sufficiently proximate the tire-side coupling such that pressure measured by the sensor is substantially similar to pressure of an inflatable tire alone when coupled to the tire-side coupling;
    a controller programmed to regulate inflation of an inflatable tire coupled to the tire-side coupling, comprising operations of:
        starting tire inflation by operating the inflation valve to permit air flow between the couplings;

during substantially continuous inflation, substantially continuously reading pressure measured by the sensor;

when measured pressure exceeds a target pressure by a prescribed margin, ceasing inflation by operating the inflation valve to stop air flow between the couplings;

while air flow between the couplings is ceased, reading pressure measured by the sensor while operating the exhaust valve as needed to reduce measured pressure to the target pressure.

4. A computer-driven portable apparatus for establishing pressure in an inflatable object, comprising:

a compressor-side coupling and an object-side coupling interconnected by a plenum;

a remotely operated inflation valve connected to the plenum to selectively start and stop fluid flow between the couplings;

a remotely operated exhaust valve connected to the plenum to selectively exhaust fluid from the plenum;

a pressure sensor configured to sense plenum pressure at a site sufficiently proximate the object-side coupling such that pressure measured by the sensor is substantially similar to pressure within an object when coupled to the object-side coupling;

a controller programmed to regulate inflation of an object coupled to the object-side coupling, comprising operations of:

starting object inflation by operating the inflation valve to permit fluid flow between the couplings;

during substantially continuous inflation, substantially continuously reading pressure measured by the sensor;

when measured pressure exceeds a target pressure by a prescribed margin, ceasing inflation by operating the inflation valve to disable fluid flow between the couplings;

while fluid flow is disabled between the couplings, reading pressure measured by the sensor while operating the exhaust valve as needed to reduce measured pressure to the target pressure.

5. The apparatus of claim 4, where:

the apparatus further includes a temperature sensor configured to sense fluid temperature within the plenum;

the controller is programmed to perform further operations comprising reading temperature measured by the temperature sensor;

the operation of reading pressure measured by the sensor further includes adjusting said pressure to compensate for temperature output by the temperature sensor.

6. The apparatus of claim 4, where the controller is programmed to receive input of the target pressure by performing operations comprising:

responsive to a user activated event occurring at a time, establishing the target pressure as being pressure measured by the pressure sensor at the time;

where the event comprises user activation of a hand control.

7. The apparatus of claim 4, where the controller is programmed to perform further operations comprising receiving specification of the target pressure by user input of the target pressure via user interface.

8. The apparatus of claim 4, where the controller is programmed perform operations comprising:

receiving user input designating one or more pre-programmed inflation settings;

indexing the designated inflation settings against a record of inflation setting dependent output pressures to determine the target pressure.

9. The apparatus of claim 8, where the inflation settings include one or more of: season of year, front versus rear tire, vehicle model, vehicle profile.

10. A method for regulating inflation of an object, comprising:

starting object inflation by coupling a fluid source to the object via a plenum;

concurrent with inflation, substantially continuously measuring pressure within the plenum using a sensor sufficiently proximate the object such that pressure measured by the sensor is substantially similar to pressure within the object;

when measured pressure exceeds a target pressure by a prescribed margin, stopping inflation by stopping fluid flow between the fluid source and the object;

while fluid flow between the fluid source and the object is stopped, reading pressure measured by the sensor and deflating the object as needed to reduce measured pressure to the target pressure.

11. The method of claim 10, where:

the operations further comprise measuring temperature within the plenum;

each operation of measuring pressure further includes adjusting measured pressure to compensate for the measured temperature.

12. The method of claim 10, the operations further comprising receiving the target pressure, comprising:

responsive to a user activated event occurring at a time, establishing the target pressure as being pressure measured by the pressure sensor at the time;

where the event comprises user activation of a hand control.

13. The method of claim 10, the operations further comprising:

receiving specification of the target pressure by user input of the target pressure via user interface.

14. The method of claim 10, the operations further comprising:

receiving specification of the target pressure in the form of user input of the target pressure via user interface.

15. The method of claim 10, the operations further comprising:

receiving user input designating one or more pre-programmed inflation settings;

indexing the designated inflation settings against a record of inflation setting dependent, output pressures to determine the target pressure.

16. The method of claim 15, where:

the inflation settings include one or more of: season of year, front versus rear tire, vehicle model, user-defined profile.

17. A computer-driven portable apparatus for establishing pressure in an inflatable object, comprising:

a compressor-side coupling and an object-side coupling interconnected by a plenum;

a computer operated inflation valve connected to the plenum to selectively start and stop fluid flow between the couplings;

a computer operated exhaust valve connected to the plenum to selectively exhaust fluid from the plenum;

a pressure sensor configured to sense plenum pressure at a site sufficiently proximate the object-side coupling such that pressure measured by the sensor is substantially similar to pressure within an object when coupled to the object-side coupling, and to provide a machine-readable output of the sensed plenum pressure;

a computer programmed to regulate inflation of an object coupled to the object-side coupling, comprising operations of:

starting object inflation by directing the inflation valve to permit fluid flow between the couplings;

during substantially continuous inflation, substantially continuously monitoring the output of the sensed plenum pressure from the pressure sensor;

when the output of sensed plenum pressure exceeds a predetermined pressure by a prescribed margin, ceasing inflation by directing the inflation valve to disable fluid flow between the couplings;

while fluid flow is disabled between the couplings, monitoring the output of the sensed plenum pressure from the pressure sensor while operating the exhaust valve as needed to reduce sensed plenum pressure to the predetermined pressure.

18. The apparatus of claims 1 or 3 or 4, where the pressure sensor is configured to provide the controller with a computer-readable output of measured pressure.

19. A method for regulating inflation of an object, comprising steps of:

a step of starting object inflation by coupling a fluid source to the object via a plenum;

a step of, concurrent with inflation, substantially continuously measuring pressure within the plenum using a sensor sufficiently proximate the object such that pressure measured by the sensor is substantially similar to pressure within the object;

a step of, when measured pressure exceeds a target pressure by a prescribed margin, stopping inflation by stopping fluid flow between the fluid source and the object;

a step of, while fluid flow between the fluid source and the object is stopped, reading pressure measured by the sensor and deflating the object as needed to reduce measured pressure to the target pressure.

* * * * *